United States Patent [19]
Noda

[11] Patent Number: 5,910,157
[45] Date of Patent: Jun. 8, 1999

[54] AUTOMOTIVE AIR CONDITIONING SYSTEM

[75] Inventor: Yoshitoshi Noda, Tochigi, Japan

[73] Assignee: Calsonic Corporation, Tokyo, Japan

[21] Appl. No.: 08/984,020

[22] Filed: Dec. 3, 1997

[30] Foreign Application Priority Data

Jun. 30, 1997 [JP] Japan .................................. 9-174465

[51] Int. Cl.$^6$ .................................................. B60H 1/32
[52] U.S. Cl. .......................... 62/133; 62/244; 62/238.7; 165/43
[58] Field of Search ............................ 62/133, 183, 244, 62/238.6, 238.7, 323.1, 324.1; 165/42, 43

[56] References Cited

U.S. PATENT DOCUMENTS

| | | | |
|---|---|---|---|
| 3,926,000 | 12/1975 | Scofield | 62/183 X |
| 5,499,511 | 3/1996 | Hara et al. | |
| 5,528,900 | 6/1996 | Prasad | 62/244 X |
| 5,660,051 | 8/1997 | Sakakibara et al. | 62/133 |

FOREIGN PATENT DOCUMENTS

| | | |
|---|---|---|
| 2-500677 | 3/1990 | Japan . |
| 5-201243 | 8/1993 | Japan . |
| 7-101227 | 4/1995 | Japan . |
| 7-132728 | 5/1995 | Japan . |
| 8-295117 | 11/1996 | Japan . |
| 9-109669 | 4/1997 | Japan . |

Primary Examiner—Henry Bennett
Assistant Examiner—Susanne C. Tinker
Attorney, Agent, or Firm—Foley & Lardner

[57] ABSTRACT

An air conditioning system for a motor vehicle powered by an internal combustion engine has a first system for carrying out a first cycle, which includes a compressor driven by the engine, a main condenser, a first sub-condenser and an evaporator which are connected through pipes to form a first refrigerant circulation circuit through which a refrigerant flows from an outlet of the compressor to an inlet of the same while changing its phase, the first cycle causing the first sub-condenser as a heater and the evaporator as a cooler when operated. The air conditioning system has further a second system for carrying out a second cycle, which includes the compressor and a second sub-condenser which are connected through pipes to form a second refrigerant circulation circuit through which the refrigerant flows from the outlet of the compressor to the inlet of the same while changing its phase, the second cycle causing the second sub-condenser as a heater when operated. First and second independent air flow passages are defined. The first passage has the heater core, the first sub-condenser and the evaporator installed therein, and the second passage has the second sub-condenser installed therein. A sub-evaporator is arranged in the pipe extending from an outlet of the second sub-condenser to an inlet of the compressor. A cooling water circuit is arranged through which engine cooling water of the engine is fed to the sub-evaporator to carry out heat exchange between the engine cooling water and the refrigerant flowing in the pipe. A control device is arranged to control, when the second system is under operation, the flow of engine cooling water directed to the sub-evaporator in accordance with a load of the engine.

11 Claims, 8 Drawing Sheets

AUTOMOTIVE AIR CONDITIONING SYSTEM

BACKGROUND OF THE INVENTION

1. Field of the Invention

The present invention relates-in general to an automotive air conditioning system of double function type which has two function cycles, one being a cooling cycle for cooling air by practically using the system as a closed refrigeration system and the other-being a heating cycle for heating air while dehumidifying the same by practically using the system as a heat pump system. More specifically, the present invention is concerned with an automotive dual air conditioning system which incorporates thereinto the principle of the system of double function type.

2. Description of the Prior Art

Hitherto, various types of air conditioning systems have been proposed and put into practical use particularly in the field of motor vehicle. Some are of the above-mentioned double function type.

In long body passenger cars, such as one-box type car or the like, there has been widely used a so-called dual air conditioning system which comprises a first air conditioning unit for conditioning air fed to a relatively front portion of a passenger room and a second air conditioning unit for conditioning air fed to a relatively rear portion of the passenger room.

Nowadays, for obtaining various advantages expected when combined, some of the dual air conditioning systems employ the principal of the system of double function type. That is, for example, the first air conditioning unit comprises a first evaporator constituting part of a closed refrigerant circuit of an air conditioning system of double function type and a heater core fed with engine cooling water, and the second air conditioning unit comprises a second evaporator connected to the closed refrigerant circuit and a condenser connected in series to the second evaporator to serve as a heater.

However, due to inherent construction, the above-mentioned dual air conditioning system of double function type has failed to give users satisfaction particularly in winter. That is, in cold seasons, the system assumes a so-called heating mode. However, the system assuming such heating mode has failed to provide the passenger room with a sufficiently warmed air particularly for a time just after engine starting. In fact, during such time, the temperature of engine cooling water fed to the heater core is still low and the temperature of a refrigerant led to the condenser is low, which causes such undesirable phenomenon. This phenomenon becomes much severe when the engine is of a fuel direct injection type which produces less heat and thus produces engine cooling water having a relatively low temperature.

In order to eliminate such drawback, the applicant has hitherto proposed a measure of providing the system with an extra evaporator for warming, with usage of heat of engine cooling water, the refrigerant just returned to a compressor of the closed refrigerant circuit. With this, the compressed refrigerant led to the condenser can have a higher temperature thereby to promote the heating function of the condenser. That is, the extra evaporator is disposed in a refrigerant flow line extending from the second evaporator to the compressor and warmed by the engine cooling water passing therethrough. That is, the extra evaporator is of a heat exchanger by which a heat exchange is carried out between the returning refrigerant just directed to the compressor and the engine cooling water led from a water jacket of an associated internal combustion engine. This measure is described in Japanese Patent Application 9-90854.

FIG. 12 is a graph showing results of two experiments carried out by the applicant by using above-mentioned measure. The characteristic line indicated by reference "a" shows a temperature of air warmed by a conventional heater core fed with an engine cooling water, while, the characteristic curve indicated by reference "b" shows a temperature of air warmed by a heat pump system which has the extra evaporator incorporated therewith. As is seen from this graph, when the temperature of engine cooling water is below 70° C., the heat pump system surpasses the conventional heater core in warming air. While, when the-temperature of the engine cooling water exceeds 70° C., the conventional heater core surpasses the heat pump system.

The applicant has thereafter proposed other measures for improving the air conditioning system equipped with the extra evaporator, some being to provide a bypass circuit through which the returning refrigerant flows bypassing the extra evaporator, and some being to control the flow of engine cooling water led to the extra evaporator by using ON/OFF valve.

SUMMARY OF THE INVENTION

It is therefore an object of the present invention to provide an automotive air conditioning system which is based on the above-mentioned measures.

It is an object of the present invention to provide an automotive air conditioning system in which the flow of engine cooling water directed to the sub-evaporator is controlled in accordance with a load of the engine of an associated motor vehicle.

According to the present invention, there is provided an air conditioning system for a motor vehicle powered by an internal combustion engine. The system comprises first means for carrying out a first cycle, which includes a compressor driven by the engine, a main condenser, a first sub-condenser and an evaporator which are connected through pipes to form a first refrigerant circulation circuit through which a refrigerant flows from an outlet of the compressor to an inlet of the same while changing its phase, the first cycle causing the first sub-condenser as a heater and the evaporator as a cooler when operated; second means for carrying out a second cycle, which includes the compressor and a second sub-condenser which are connected through pipes to form a second refrigerant circulation circuit through which the refrigerant flows from the outlet of the compressor to the inlet of the same while changing its phase, the second cycle causing the second sub-condenser as a heater when operated; switch means for switching the first and second means; a heater core; third means for defining first and second independent air flow passages, the first passage having heater core, the first sub-condenser and the evaporator installed therein, the second passage having the second sub-condenser installed therein; a sub-evaporator arranged in the pipe extending from an outlet of the second sub-condenser to an inlet of the compressor; a first cooling water circuit through which engine cooling water of the engine is fed to the heater core to warm air passing through the heater core; a second cooling water circuit through which engine cooling water of the engine is fed to the sub-evaporator to carry out heat exchange between the engine cooling water and the refrigerant flowing in the pipe; and fourth means for controlling the flow of engine cooling water directed to the sub-evaporator in accordance with a load of the engine when the switch means selects the second means.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
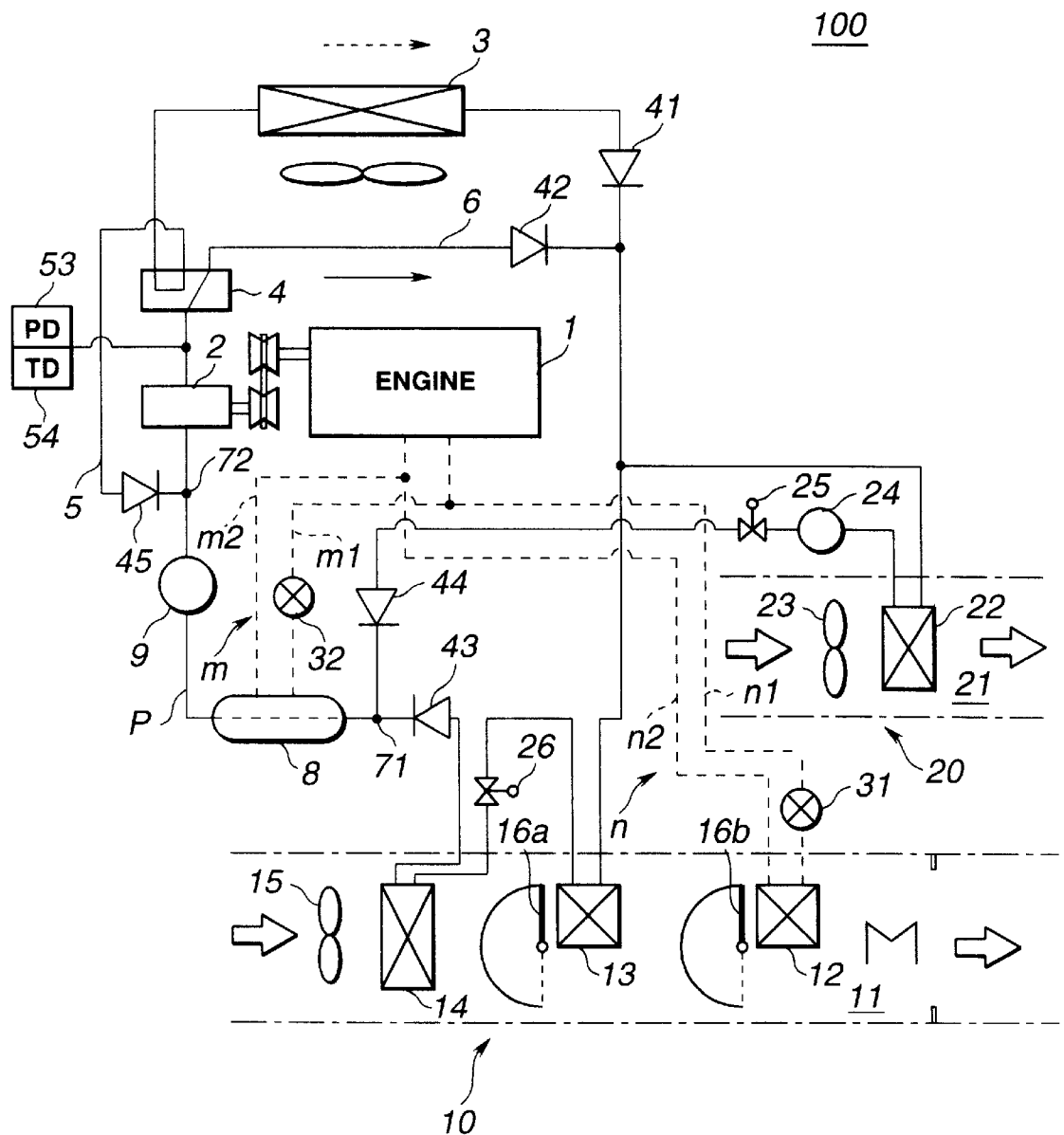
FIG. 1 is a schematically illustrated automotive dual air conditioning system according to the present invention.

Referring to FIG. 1 of the drawings, there is schematically shown an automotive dual air conditioning system 100 according to the present invention. As will become apparent as the description proceeds, the system 100 is of the above-mentioned double function type.

The dual air conditioning system 100 generally comprises a first air conditioning unit 10, a second air conditioning unit 20 and an interconnecting means which operatively connects the first and second units 10 and 20 in such a manner as will be described hereinafter.

The first air conditioning unit 10 is arranged to condition air which is fed to a relatively front portion of a passenger room, while the second air conditioning unit 20 is arranged to condition air which is fed to a relatively rear portion of the passenger room.

The air to be conditioned by these units 10 and 20 is taken from the outside and/or inside of the vehicle with an aid of an electric blower installed in an air intake portion (not shown) located upstream of air flow passages 11 and 21 of the two units 10 and 20. For the selective intake of air from the outside and inside, an intake door (not shown) is pivotally installed in the air intake portion.

The first air conditioning unit 10 comprises the air flow passage 11 through which air is forced to flow in a direction indicated by arrows. An electric fan 15, an evaporator 14, a first sub-condenser 13 and a heater core 12 are installed in the air flow passage 11 in order with respect to the flowing direction of air. As will be described hereinafter, the evaporator 14 and the first sub-condenser 13 constitute part of an enclosed refrigeration system, and the heater core 12 is fed through a cooling water circuit "n" with engine cooling water to heat or warm air flowing through the air flow passage 11. In front of the first sub-condenser 13, there is pivotally installed a first air mix door 16a by which two independent passages are defined, one being a passage passing through the first sub-condenser 13, and the other being a passage bypassing the first sub-condenser 13. In front of the heater core 12, there is pivotally installed a second air mix door 16b by which two independent air passages are defined, one being a passage passing through the heater core 12, and the other being a passage bypassing the heater core 12. Just downstream of these two passages, there is defined an air mix chamber "M" Thus, by changing the angle of the air mix doors 16a and 16b, the air led into the air mix chamber "M" can have a desired temperature. The air flow passage 11 has at a downstream portion various outlet openings (not shown) from which conditioned air is blown to the front portion of the passenger room.

The second air conditioning unit 20 comprises the air flow passage 21 through which air is forced to flow in a direction indicated by arrows. An electric fan 23 and a second sub-condenser 22 are installed in the air flow passage 21 in order with respect to the flowing direction of air. As will be described hereinafter, the second sub-condenser 22 constitutes part of the enclosed refrigeration system. As will be from the drawing, the second sub-condenser 22 is arranged in parallel with a series arrangement consisting of the evaporator 14 and the first sub-condenser 13. The air flow passage 21 has at a downstream portion outlet openings (not shown) from which air is blown to the rear portion of the passenger room.

Designated by numeral 1 is an internal combustion engine which is mounted in an engine room of an associated motor vehicle. A compressor 2 driven by the engine 1 and a main condenser 3 are also mounted in the engine room.

The enclosed refrigeration system generally comprises a first section which has the compressor 2, the main condenser 3, the first sub-condenser 13 and the evaporator 14 which are connected through pipes in an illustrated manner and a second section which has the second sub-condenser 22 which is connected to the first section through pipes in an illustrated manner.

A first electromagnetic valve 26 with an orifice is arranged in the pipe extending between the first sub-condenser 13 and the evaporator 14 of the first section. A liquid tank 24 and a second electromagnetic valve 25 with an orifice are arranged in the pipe connected to an outlet of the second-sub condenser 22 of the second section. Of course, the enclosed refrigeration system has a suitable refrigerant contained therein. The orifice of each valve 26 or 25 is, for example, about 1.45 mm in diameter.

A four-way valve 4 is arranged in the first section, which switches the air conditioning system 100 to a cooling cycle or a heating cycle. As shown, the four-way valve 4 has an inlet port connected to an outlet port of the compressor 2 and three outlet ports respectively connected to an inlet port of the main condenser 3, an inlet port of the compressor 2 through a refrigerant return circuit 5 and an outlet pipe of the main condenser 3 through a bypass circuit 6. The refrigerant return circuit 5 is used for transporting a stagnated refrigerant in the cycle in a rest condition to the other cycle just starting its operation, as will be clarified hereinafter. The refrigerant return circuit 5 and the bypass circuit 6 have check valves 45 and 42 respectively. The outlet pipe from the main condenser 3 has a check valve 41 at a position upstream of the portion to which the bypass circuit 6 is connected.

When, for achieving the heating cycle, the four-way valve 4 assumes a heating position as shown in the drawing, the compressed refrigerant from the compressor 2 is directed to the bypass circuit 6 bypassing the main condenser 3. While, when, for achieving the cooling cycle, the valve 4 assumes a cooling position, the compressed refrigerant from the compressor 2 is led to main condenser 3.

As shown, the outlet pipe from the evaporator 14 and the outlet pipe from the second sub-condenser 22 are joined at a portion 71 and connected to the inlet port of the compressor 2 through a circuit segment P. The circuit segment P is joined with the return circuit 5 at a portion 72 just upstream of the inlet port of the compressor 2. The respective outlet pipes from the evaporator 14 and the second sub-condenser 22 are equipped with check valves 43 and 44.

As shown, the circuit segment P has both a sub-evaporator 8 and an accumulator 9 disposed therein.

The sub-evaporator 8 is of a heat exchanger which is fed through a cooling water circuit "m" with an engine cooling water as a heat source. That is, in the sub-evaporator 8, heat exchange is carried out between the refrigerant and the engine cooling water. More specifically, the refrigerant is heated or at least warmed by the engine cooling water. The sub-evaporator 8 is located in an open area such as the engine room or the like.

It is to be noted that usage of such sub-evaporator 8 is aimed to effectively use a heat possessed by the engine cooling water. That is, even when the engine cooling water is not warmed to such a level as to sufficiently operate the heater core 12, the water can raise the enthalpy of the refrigerant by effecting heat exchange between the cooling water and the refrigerant. Under this condition, the first and second sub-condensers 13 and 22 can exhibit heating performance higher than that expected when such heat exchange is not carried out.

The accumulator 9 on the circuit segment P is constructed to have a relatively large capacity. Thus, even when the returning refrigerant led to the accumulator 9 has a larger amount of liquid, vaporization of the liquid is smoothly achieved in the accumulator 9 thereby protecting the compressor 2 from damage.

As is mentioned hereinabove, the sub-evaporator 8 and the heater core 12 are fed with the engine cooling water through respective cooling water circuits "m" and "n". Eac circuit "m" or "n" comprises water inlet and outlet lines m1 or n1 and m2 or n2.

Figure 2:
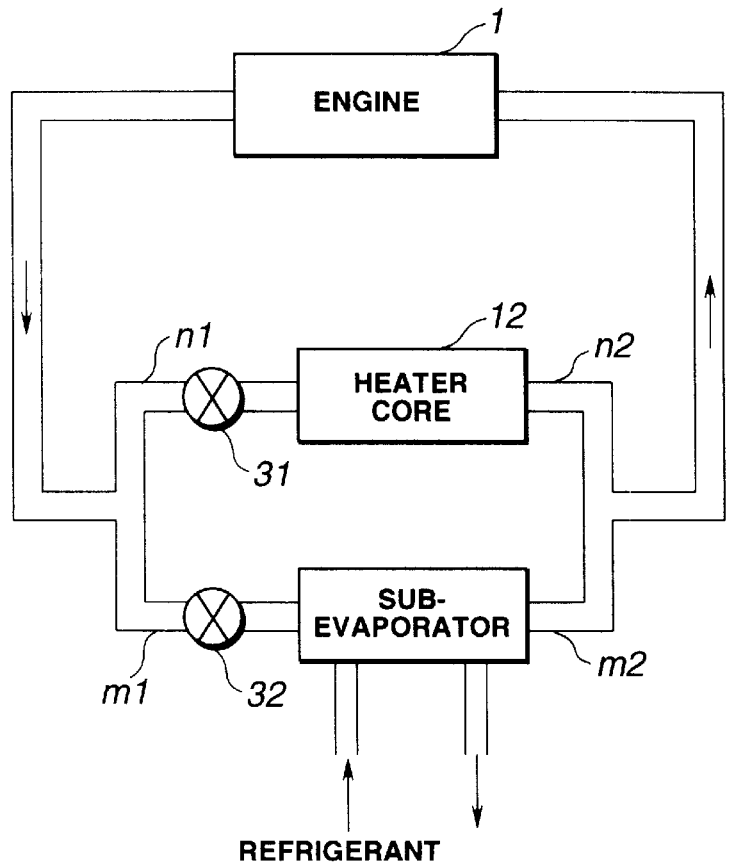
FIG. 2 is a schematic view showing a water circuit through which engine cooling water flows.

As is well seen from FIGS. 1 and 2, the inlet line no of the heater core 12 is equipped with a first flow control valve 31, and the inlet line m2 of the sub-evaporator 8 is equipped with a second flow control valve 32. The first valve 31 is of a continuously varying type which continuously varies the flow of engine cooling water flowing the heater core 12, while the second valve 32 is of an ON/OFF type which selectively opens and closes the passage directed to the sub-evaporator 8.

Figure 3:
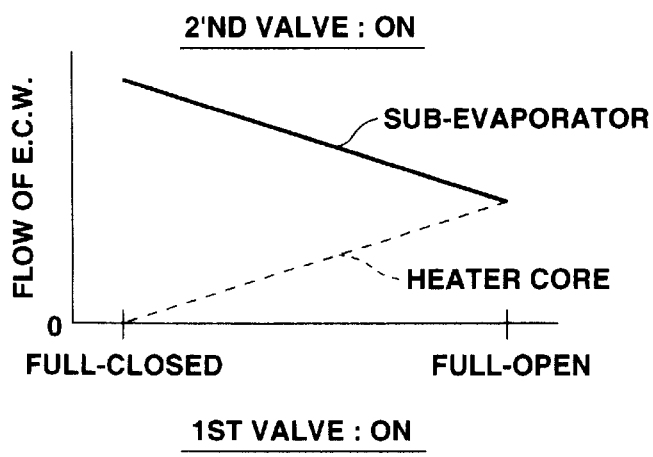
FIG. 3 is a graph showing a relationship between the flow of cooling water in an extra evaporator and the open degree of a flow control valve disposed on a water flow line of a heater core.

As will be described hereinafter, when the dual air conditioning system 100 is under the heating cycle, the second valve 32 takes ON position to feed the sub-evaporator 8 with engine cooling water. Under this ON condition of the second valve 32, the flow of engine cooling water through the sub-evaporator 8 is continuously controlled by controlling the first valve 31 coninuously. This phenomenon is depicted by the graph of FIG. 3. That is, when, with the second valve 32 assuming the full open position (viz., ON condition), the open degree of the first valve 31 is gradually increased to increase the flow of engine cooling water through the heater core 12, the flow of engine cooling water through the sub-evaporator 8 is gradually reduced.

As will be described in detail hereinafter, under the heating cycle with the second valve 32 kept fully open (viz., ON condition), the flow of engine cooling water through the sub-evaporator 8 is continuously controlled by controlling the first valve 31 in accordance with an engine rotation speed or a temperature of the engine cooling water.

At a position just downstream of the compressor 2, there are arranged a pressure detecting means "PD" and a temperature detecting-means "TD", which detect the pressure "Pd" and temperature "Td" possessed by the highly pressurized refrigerant just discharged from the compressor 2. The pressure detecting means "PD" is a pressure switch having diaphragm installed therein or a pressure sensor having a transducer by which the detected pressure is converted to a corresponding voltage. The temperature detecting means "TD" is a temperature sensor having a transducer by which the detected temperature is converted to a corresponding voltage. As will be described hereinafter, when the pressure "Pd" and the temperature "Td" of the discharged refrigerant from the compressor 2 are raised, various controls are carried out to reduce such raisings.

The refrigerant return circuit 5 is operated when, due to a very cold condition of the surrounding, the engine cooling water is very cold and thus can not be used as a heat source. That is, in such a case, a refrigerant stagnated in the main condenser 3 is returned to the inlet of the compressor 2 through the return circuit 5. With this, the dual air conditioning system 100 can start the heating cycle with an increased amount of refrigerant.

In the following, operation of the dual air conditioning system 100 of the invention will be described.

(1) Initial Stage of Heating Cycle

Just after starting of the engine 1, particularly, in cold seasons, the temperature of engine cooling water is still very low. Thus, for such time, the engine cooling water can not be used as a heat source for the heater core 12. Furthermore, some of refrigerant is still kept stagnated in the main condenser 3 causing a lack of refrigerant fed to the compressor 2.

For heating both the front and rear portions of a passenger room, the first valve 31 is fully closed, the second valve 32 is fully opened (ON condition), the first and second electromagnetic valves 26 and 25 are opened and the four-way valve 4 assumes the heating position as shown in FIG. 1. The first air mix door 16a takes a position to fully open the passage passing through the first sub-condenser 13. While, the second air mix door 16b takes a position to fully close the passage passing through the heater core 12, as shown.

When now the compressor 2 is started to operate, the stagnated refrigerant in the main condenser 3 is fed back into the inlet side of the compressor 2 through the four-way valve 4 and the refrigerant return circuit 5.

Thus, thereafter, pressurized refrigerant from the compressor 2 is forced to flow through the four-way valve 4, the bypass circuit 6, the first sub-condenser 13, the orifice of the electromagnetic valve 26 and the evaporator 14 to the junction portion 71, and part of the refrigerant from the bypass circuit 6 is forced to flow through the second sub-condenser 22, the liquid tank 24 and the orifice of the second electromagnetic valve 25 to the junction portion 71. The refrigerant joined at the junction portion 71 is then forced to flow through the sub-evaporator 8 and the accumulator 9 to the inlet of the compressor 2.

During this flow, the refrigerant which has lost the heat energy at the first and second sub-condensers 13 and 22 gets heat at the sub-evaporator 8 for the above-mentioned reason. The refrigerant thus somewhat warmed is compressed by the compressor 2. Accordingly, with repetition of the heating cycle, the enthalpy of the refrigerant discharged from the compressor 2 is gradually increased, and thus, heating performance of the first and second sub-condensers 13 and 22 is gradually increased. Accordingly, both the first and second units 10 and 20 of the air conditioning system 100 can feed the front and rear portions of the passenger room with a sufficiently warmed air instantly after the engine starting.

More specifically, in the first unit 10, air flowing in the air flow passage 11 is dehumidified (cooled) by the evaporator 14 and then warmed by the first sub-condenser 13 before being blown to the front portion of the passenger room. While, in the second unit 20, air flowing in the air flow passage 21 is warmed by the second sub-condenser 22 before being blown to the rear portion of the passenger room.

(2) Stable Stage of Heating Cycle

With increase of time, the temperature of the engine cooling water is increased. When the temperature of engine cooling water is raised to a certain level, controlling of or by the first valve 31 starts.

As has been mentioned hereinafore, when the temperature of the returning refrigerant just led to the compressor 2 is increased, the heating effect of the first and second sub-condensers 13 and 22 is increased and thus temperature of air fed to the passenger room by the first and second units 10 and 20 is increased. Of course, the heating ability of the sub-evaporator 8 against the refrigerant can be controlled by the flow of the engine cooling water led to the sub-evaporator 8. That is, the heating ability increases with increase of the flow of engine cooling water to the sub-evaporator 8.

In the present invention, the flow of engine cooling water to the sub-evaporator 8 is adjusted by controlling the first valve 31, as will be described in detail hereinnext.

Figures 4A, 4B:
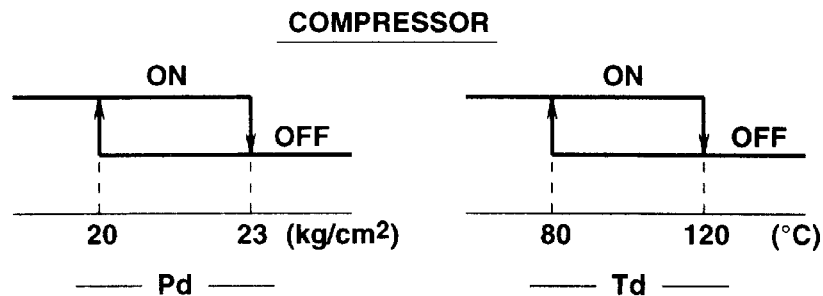
FIG. 4A is a chart showing ON/OFF characteristic of a compressor with respect to a discharge pressure of the compressor.
FIG. 4B is a chart showing ON/OFF characteristic of the compressor with respect to a temperature of refrigerant discharged from the compressor.
Figures 5A, 5B:
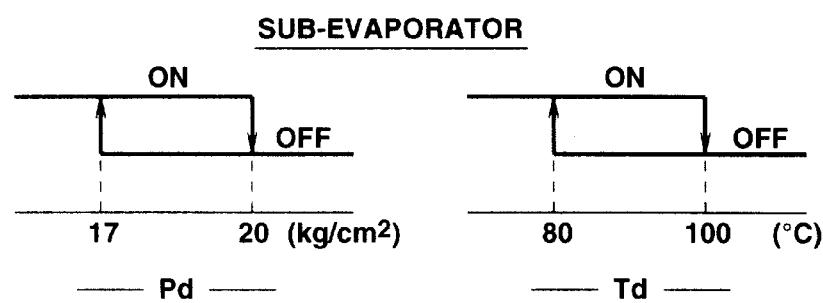
FIG. 5A is a chart showing ON/OFF characteristic of an extra evaporator with respect to the discharge pressure of the compressor.
FIG. 5B is a chart showing ON/OFF characteristic of the extra evaporator with respect to a temperature of refrigerant discharged from the compressor.

In order to protect the compressor 2 from overloading, ON/OFF control is practically applied to both the compressor 2 and the second flow control valve 32 in accordance with the pressure "Pd" and temperature "Td" possessed by the pressurized refrigerant just discharged from the compressor 2. That is, as is seen from FIGS. 4A and 4B, when, under operation of the compressor 2, the pressure "Pd" is increased to about 23 Kg/cm$^2$ or the temperature "Td" is increased to about 120° C., the compressor 2 becomes deenergized. While, under OFF condition of the compressor 2, the pressure "Pd" is decreased to about 20 Kg/cm$^2$ or the temperature "Td" is decreased to about 80° C., the compressor 2 becomes energized. As is seen from FIGS. 5A and 5B, when, under open condition of the second valve 32, the pressure "Pd" is increased to about 20 Kg/cm$^2$ or the temperature "Td" is increased to about 100° C., the second valve 32 is closed. While, under closed condition of the second valve 32, the pressure "Pd" is decreased to about 17 Kg/cm$^2$ or the temperature "Td" is decreased to about 80° C., the second valve 32 is opened. When the second valve 32 is closed, the feeding of engine cooling water to the sub-evaporator 8 is stopped and thus heating to the returning refrigerant is stopped. With this, the pressure "Pd" and temperature "Td" of the refrigerant just discharged from the compressor 2 are reduced.

It is to be noted that the ON/OFF operation of the second valve 32 is carried out within a range which is practically applied to the ON/OFF operation of the compressor 2. With this measure, the frequency of the ON/OFF switching of the compressor 2 is reduced. As is known, if the ON/OFF switching of the compressor 2 is too frequent, operability of the engine is lowered.

As has been mentioned hereinabove, the flow of engine cooling water to the sub-evaporator 8 is controlled in accordance with an engine rotation speed or a temperature of the engine cooling water.

In the following, a case will be described, wherein the flow control of the engine cooling water is made in accordance with the engine rotation speed.

Figure 6:
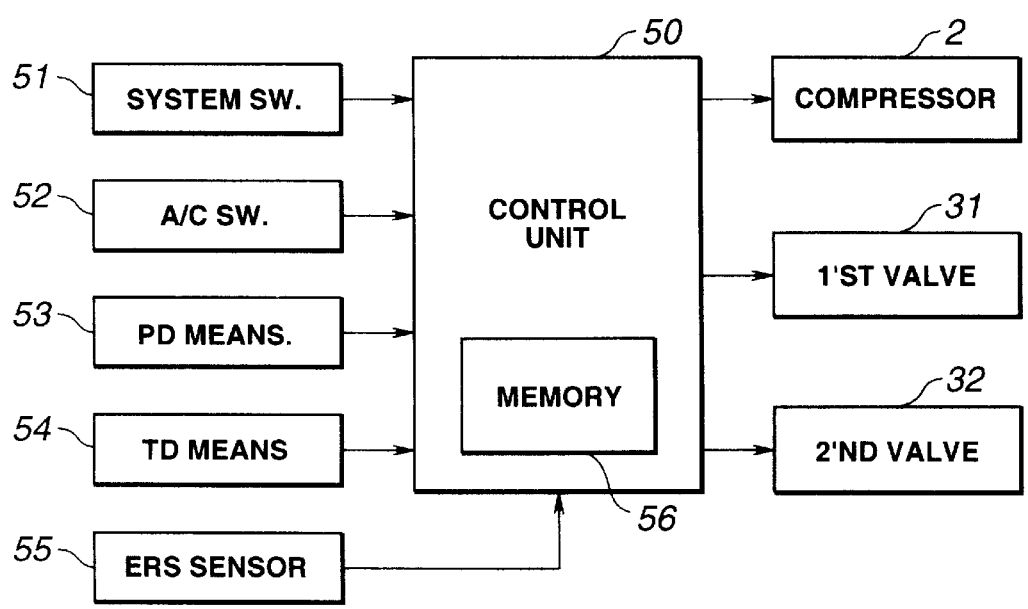
FIG. 6 is a block diagram of a control system practically employable in the dual air conditioning system of the invention.

FIG. 6 is a block diagram of a control system which uses the engine rotation speed as a factor far controlling the flow of engine cooling water directed to the sub-evaporator 8.

The control system comprises a control unit 50 which is a microcomputer having a memory 56. Information signals from a system switch 51, an air conditioner switch 52, the pressure detecting means (PD) 53, the temperature detecting means (TD) 54 and an engine rotation speed sensor 55 are all fed to the control unit 50. Since the compressor 2 is driven by the engine 1 =through a drive belt (see FIG. 1), the engine rotation speed sensor 55 can serve as means for sensing the rotation speed of the compressor 2. By processing these information signals, the control unit 50 controls the compressor 2 (viz., magnet clutch of the compressor), the first flow control valve 31 and the second flow control valve 32.

The system switch 51 is a switch for switching the air conditioning system 100 to the heating cycle practically using the sub-evaporator 8. The air conditioning switch 52 is a switch for switching the system 100 to a normal air conditioning system without aid of the sub-evaporator 8. The engine rotation speed sensor 55 may be a sensor for detecting a crank angle of the engine. When the system switch 51 is turned ON and the air conditioner switch 52 is turned OFF, the control unit 50 starts the heating cycle of the system 100 and controls the compressor 2 and the first and second flow control valves 31 and 32 in the following manner.

Figure 7:
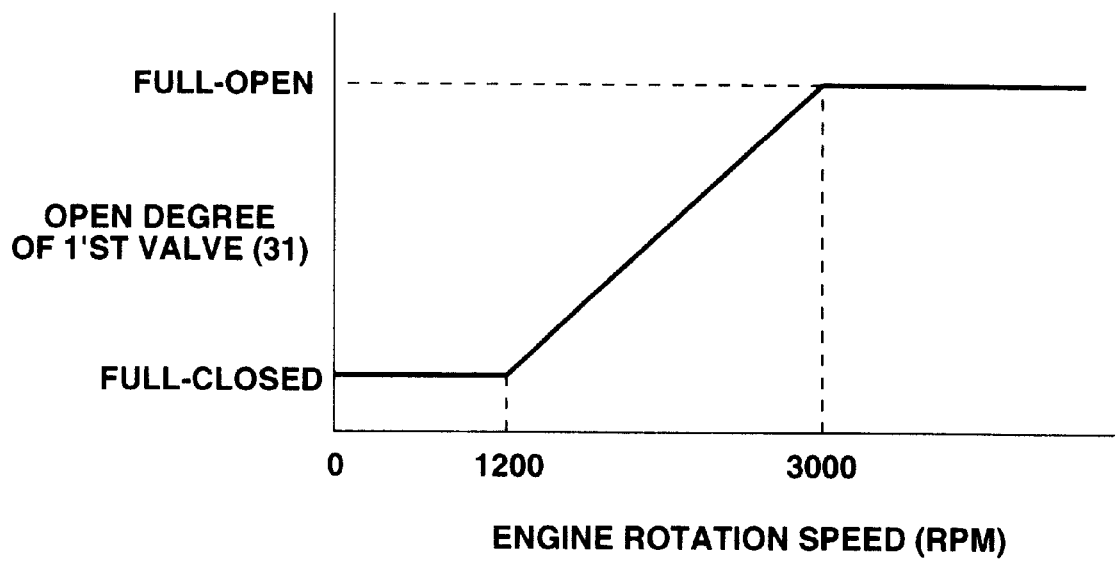
FIG. 7 is a graph showing, in case of using the control system of FIG. 6, a characteristic of a flow control valve on the water flow line of the heater core with respect to an engine speed.

The memory 56 of the control unit 50 memorizes a reference map shown by FIG. 7. The map depicts a relationship between the engine rotation speed and the open degree of the first flow control valve 31, which can induce a desired flow of engine cooling water directed to the sub-evaporator 8. As is seen from the map, when the engine rotation speed is lower than 1200 rpm, the first flow control valve 31 is fully closed. Under this condition, the flow of engine cooling water directed to the heater core 12 is zero, while the flow of engine cooling water directed to the sub-evaporator 8 is maximum. While, when the engine rotation speed exceeds 3000 rpm, the valve 31 is fully opened. Under this condition, the flow of engine cooling water directed to the heater core 12 is maximum, while the flow of engine cooling water directed to the sub-evaporator 8 is minimum. When the engine rotation speed is within a range between 1200 rpm and 3000 rpm, the open degree of the first valve 31 is proportionally varied in accordance with the engine rotation speed, and thus the flow of engine cooling water directed to the sub-evaporator 8 is gradually reduced with increase of the engine rotation speed. This phenomenon is depicted by the graph of FIG. 3.

That is, when an associated motor vehicle is under idling or moving at a very slow speed, the flow of engine cooling water to the sub-evaporator 8 is kept maximum. Thus, under this condition, the pressure "Pd" and temperature "Td" of the refrigerant just discharged from the compressor 2 are controlled by ON/OFF operation of the second flow control valve 32. When, with increase of the engine rotation speed and thus increase of the workload of the compressor 2, the pressure "Pd" and temperature "Td" of the discharged refrigerant are raised, the open degree of the first valve 31 is gradually increased in accordance with the engine rotation speed. That is, with increase of the engine rotation speed, the flow of engine cooling water directed to the sub-evaporator 8 is reduced thereby reducing heat given to the refrigerant from the engine cooling water.

Figure 8:
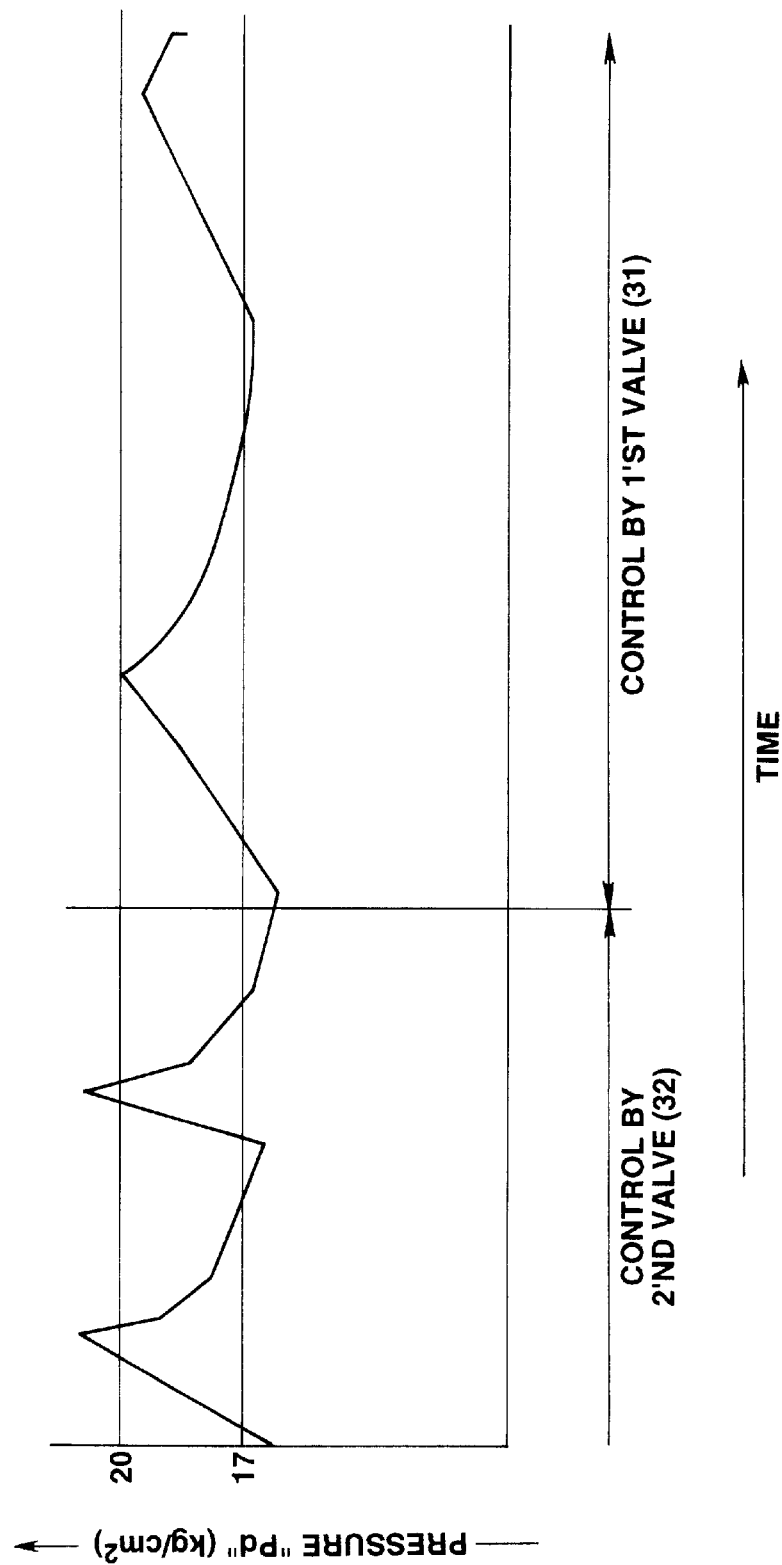
FIG. 8 is a chart for explaining an advantage obtained from the air conditioning system using the control system of FIG. 6.

FIG. 8 is a chart for explaining an advantage obtained from the air conditioning system 100 using the above-mentioned control system of FIG. 6. In the chart of FIG. 8, the axis abscissa shows elapsed time, while the axis of ordinate shows the pressure "Pd". As is seen from this chart, while the flow of engine cooling water directed to the sub-evaporator 8 is still controlled by the second valve 32, the pressure "Pd" shows a marked fluctuation. While, once the control of the flow of engine cooling water directed to the sub-evaporator 8 is made by the first valve 31, such fluctuation becomes very small, which induces a stable flow of the refrigerant in the circuit of the system 100 in the heating cycle. Experiments have revealed that similar advantage is also obtained in case of the temperature "Td" possessed by the refrigerant just discharged by the compressor 2. That is, in this case, the fluctuation of the temperature "Td" is controlled within a range between 80° C. and 100° C.

In the following, another case will be described, wherein the flow control of the engine cooling water to the sub-evaporator 8 is made in accordance with the temperature of the engine cooling water.

Figure 9:
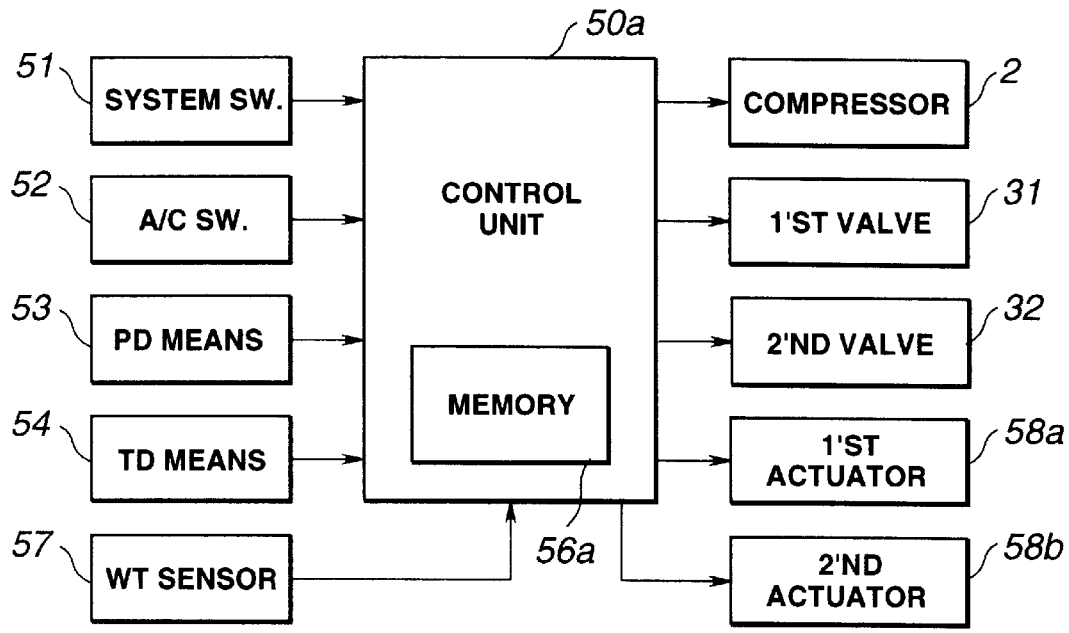
FIG. 9 is a block diagram of another control system practically employable in the dual air conditioning system of the invention.

FIG. 9 is a block diagram of a control system which uses the temperature of engine cooling water as a factor for controlling the flow of engine cooling water directed to the sub-evaporator 8.

The control system comprises a control unit 50a which is a microcomputer having a memory 56a. Information signals from a system switch 51, an air conditioner switch 52, the pressure detecting means (PD) 53, the temperature detecting means (TD) 54 and a cooling water temperature sensor 57 are all fed to the control unit 50a. By processing these information signals, the control unit 50a controls the compressor 2, the first and second valves 31 and 32 and first and second actuators 58a and 58b for the first and second air mix doors 16a and 16b.

The temperature sensor 57 may be a sensor for sensing the temperature of the engine cooling water just discharged from the water jacket of the engine 1. When the system switch 51 is turned ON and the air conditioner switch 52 is turned OFF, the control unit 50a starts the heating cycle of the system 100 and controls the compressor 2 and the first and second flow control valves 31 and 32 in the following manner.

Figure 10:
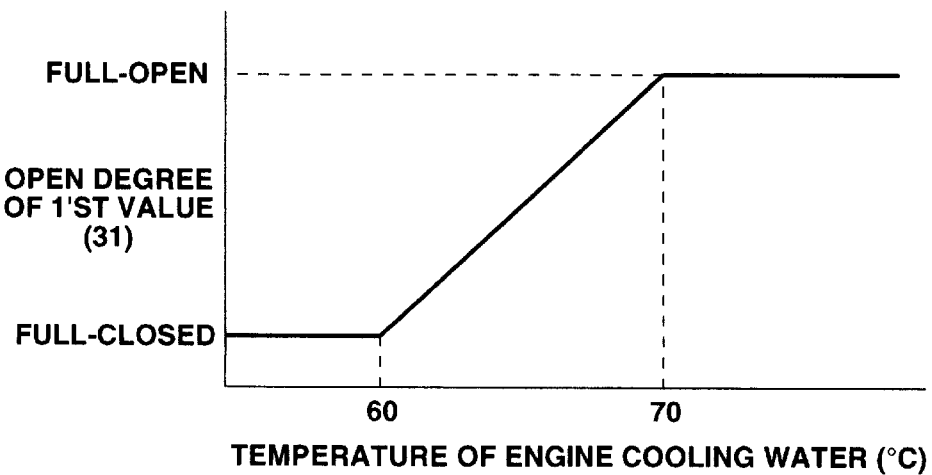
FIG. 10 is a graph showing, in case of using the control system of FIG. 9, a characteristic of a flow control valve on the water flow line of the heater core with respect to a temperature of engine cooling water.

The memory 56a of the control unit 50a memorizes a reference map shown by FIG. 10. The map depicts a relationship between the temperature of engine cooling water and the open degree of the first flow control valve 31, which can induce a desired flow of engine cooling water directed to the sub-evaporator 8. As is seen from the map, when the temperature of engine cooling water lower than 60° C., the first flow control valve 31 is fully closed. Under this condition, the flow of engine cooling water directed to the heater core 12 is zero, while, the flow of engine cooling water directed to the sub-evaporator 8 is maximum. While, when the temperature of engine cooling water exceeds 70° C., the flow of engine cooling water directed to the heater core 12 is maximum, while the flow of engine cooling water directed to the sub-evaporator 8 is minimum. When the temperature of engine cooling water is within a range between 60° C. and 70° C., the open degree of the first valve 31 is proportionally varied in accordance with the temperature of engine cooling water, and thus the flow of engine cooling water directed to the sub-evaporator 8 is gradually reduced with increase of the temperature of engine cooling water. This phenomenon is depicted by the graph of FIG. 3.

That is, when an associated motor vehicle is under a condition, such as a condition just after engine starting, wherein the temperature of engine cooling water is still low, the flow of engine cooling water to the sub-evaporator 8 is kept maximum. Thus, under this condition, the pressure "Pd" and temperature "Td" of the refrigerant just discharged from the compressor 2 are controlled by ON/OFF operation of the second flow control valve 32. When, with increase of the temperature of engine cooling water and thus increase of heat exchanging at the sub-evaporator 8, the pressure "Pd" and temperature "Td" of the discharged refrigerant are raised, the open degree of the first valve 31 is gradually increased in accordance with the temperature of engine cooling water. That is, with increase of the temperature of engine cooling water, the flow of engine cooling water directed to the sub-evaporator 8 is reduced thereby reducing heat given to the refrigerant from the engine cooling water.

FIG. 10 is a chart for explaining an advantage obtained from the air conditioning system 100 using the control system of FIG. 9. As is seen from this chart, once the control of the flow of engine cooling water directed to the sub-evaporator 8 is made by the first valve 31, fluctuation becomes very small, which induces a stable flow of the refrigerant in the circuit of the system 100 in the heating cycle. Experiments have revealed that similar advantage is also obtained in case of the temperature "Td" possessed by the refrigerant just discharged by the compressor 2. That is, in this case, the fluctuation of the temperature "Td" is controlled within a range between 80° C. and 100° C.

Figure 11:
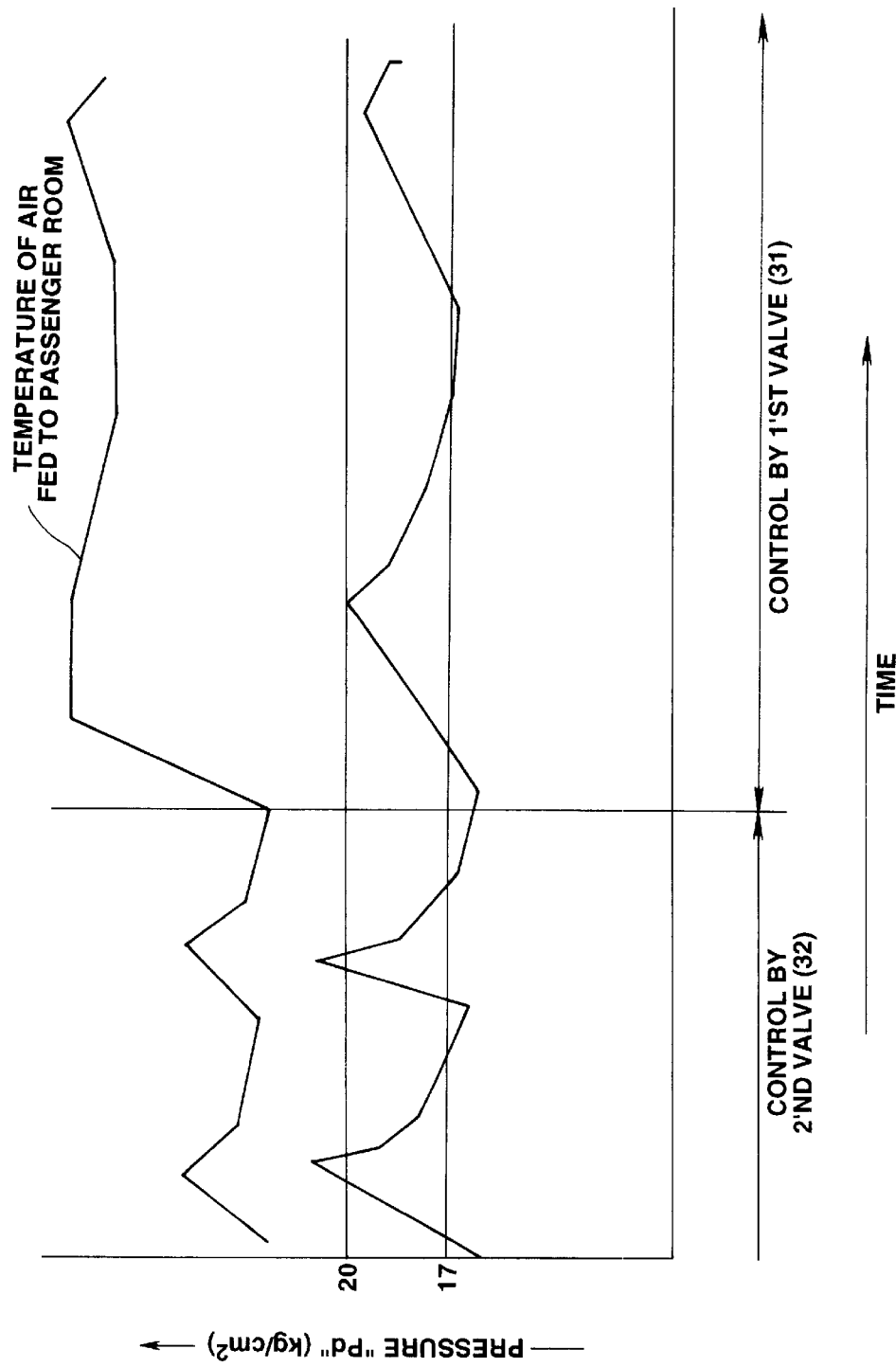
FIG. 11 is a chart for explaining advantages given from the air conditioning system using the control system of FIG. 9.
Figure 12:
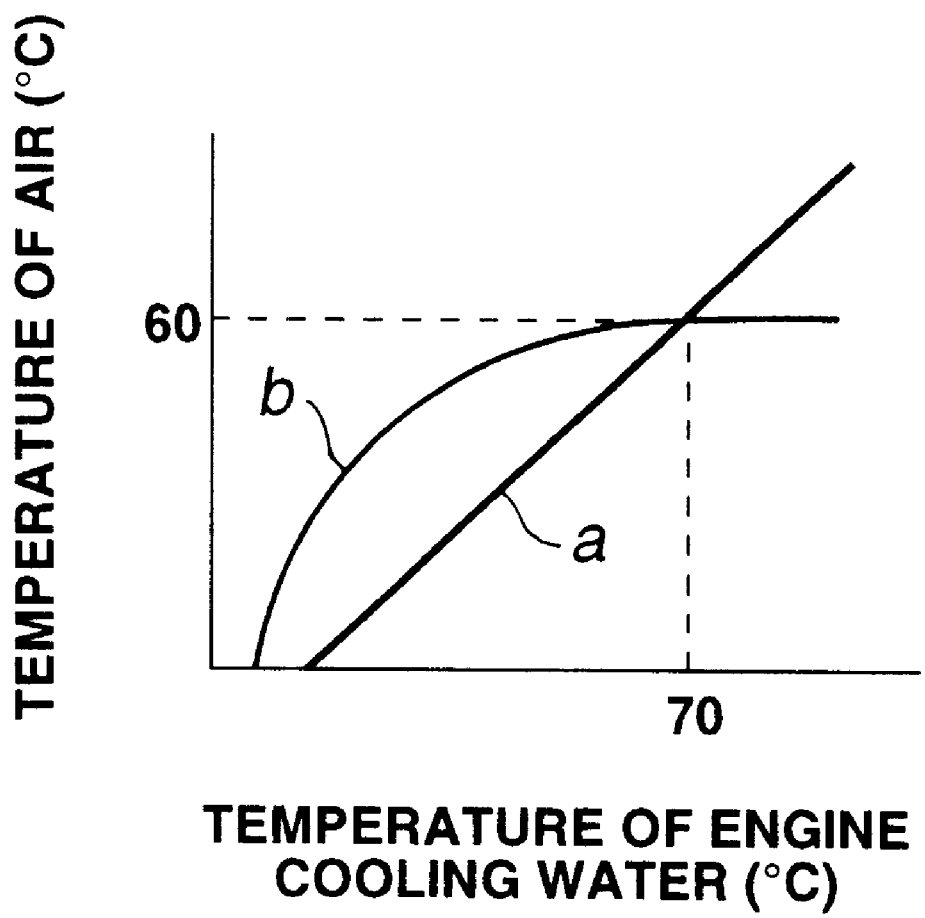
FIG. 12 is a graph depicting a heating ability of two heating systems, one being a conventional heater core type wherein air is warmed by a heater core which uses an engine cooling water as a heat source, the other being a heat pump type wherein air is warmed by a condenser installed in a closed refrigeration circuit equipped with an extra evaporator.

Once the control of the first valve 31 starts upon increase of the temperature of engine cooling water to 60° C., the control unit 50a starts controlling the first and second air mix doors 16a and 16b in the air flow passage 11 (see FIG. 1) of the first unit 10. That is, the second air mix door 16b opens the passage passing through the heater core 12. With this, the air which has been warmed by the first sub-condenser 13 is warmed by the heater core 12 before being blown to the front portion of the passenger room, as will be understood from the chart of FIG. 11.

(3) Cooling Cycle

This cycle can be applied to only the first unit 10 in the illustrated embodiment. For achieving this cycle, the second electromagnetic valve 25 is closed, and the four-way valve 4 is turned to a cooling position to connect the outlet port of the compressor 2 to the inlet port of the main condenser 3 blocking the bypass circuit 6. Furthermore, the first and second valves 31 and 32 are fully closed and the first and second air mix doors 16a and 16b assume the positions as shown in FIG. 1. Upon operation of the compressor 2, pressurized refrigerant from the compressor 2 is led into the main condenser 3. The refrigerant from the main condenser 3 is forced to flow through the first sub-condenser 13, the evaporator 14, the sub-evaporator 8 and the accumulator 9 changing its phase and returned to the compressor 2. During this flow of refrigerant, the first sub-condenser 13 serves as a heater and the evaporator 14 serves as a cooler. However, since the first air mix door 16a is in the position to fully close the passage passing through the first sub-condenser 13, the air cooled by the evaporator 14 is directly led to the air mix chamber "M" and blown into the front portion of the passenger room.

What is claimed is:

1. An air conditioning system for a motor vehicle powered by an internal combustion engine, comprising:

first means for carrying out a first cycle, which includes a compressor driven by the engine, a main condenser, a first sub-condenser and an evaporator which are connected through pipes to form a first refrigerant circulation circuit through which a refrigerant flows from an outlet of said compressor to an inlet of the same-while changing its phase, said first cycle causing said first sub-condenser as a heater and said evaporator as a cooler when operated;

second means for carrying out a second cycle, which includes said compressor and a second sub-condenser which are connected through pipes to form a second refrigerant circulation circuit through which said refrigerant flows from the outlet of the compressor to the inlet of the same while changing its phase, said second cycle causing said second sub-condenser as a heater when operated;

switch means for switching said first and second means;

a heater core;

third means for defining first and second independent air flow passages, said first passage having said heater core, said first sub-condenser and said evaporator installed therein, said second passage having said second sub-condenser installed therein;

a sub-evaporator arranged in the pipe extending from an outlet of said second sub-condenser to an inlet of said compressor;

a first cooling water circuit through which engine cooling water of said engine is fed to said heater core to warm air passing through the heater core;

a second cooling water circuit through which engine cooling water of said engine is fed to said sub-evaporator to carry out heat exchange between the engine cooling water and the refrigerant flowing in said pipe; and fourth means for controlling the flow of engine cooling water directed to said sub-evaporator in accordance with a load of said engine when said switch means selects said second means.

2. An air conditioning system as claimed in claim 1, in said fourth means comprises:

a sensor for sensing a rotation speed of said engine; and a valve for controlling the flow of engine cooling water to said sub-evaporator in accordance with the engine rotation speed sensed by said sensor.

3. An air conditioning system as claimed in claim 1, in which said fourth means comprises:

a sensor for sensing the temperature of the engine cooling water; and a valve for controlling the flow of engine cooling water to said sub-evaporator in accordance with the water temperature sensed by said sensor.

4. An air conditioning system as claimed in claim 1, in which said first and second cooling water circuits are connected to a common water jacket of said engine.

5. An air conditioning system as claimed in claim 4, in which said fourth means comprises:

a first valve arranged in said first cooling water circuit;

a second valve arranged in said second cooling water circuit;

a sensor for sensing the load of the engine; and a control unit for continuously controlling said first valve in accordance with the engine load sensed by said sensor.

6. An air conditioning system as claimed in claim 5, in which said sensor senses a rotation speed-of the engine.

7. An air conditioning system as claimed in claim 5, in which said sensor senses the temperature of the engine cooling water.

8. An air conditioning system as claimed in claim 5, in which said first valve is of a type which continuously varies the flow of engine cooling water flowing in said first cooling water circuit, and in which said second valve is of a type which selectively opens and closes the passage of said second cooling water circuit.

9. An air conditioning system as claimed in claim 1, in which said first and second means have a common refrigerant flow line which extends to said inlet of said compressor through said sub-evaporator.

10. An air conditioning system as claimed in claim 9, in which said common refrigerant flow line has an accumulator disposed therein at a position downstream of said sub-evaporator.

11. An air conditioning system as claimed in claim 1, in which said third means further comprises:

a first air mix door pivotally arranged in front of said first sub-condenser to define two independent passages, one being a passage passing through said first sub-condenser and the other being a passage bypassing said first sub-condenser; and a second mix door pivotally arranged in front of said heater core to define two independent passages, one being a passage passing through said heater core and the other being a passage bypassing said heater core.

* * * * *